United States Patent [19]
Baxi et al.

[11] Patent Number: 5,080,570
[45] Date of Patent: Jan. 14, 1992

[54] MINIATURIZED FOR GAS-ASSISTED INJECTION MOLDING

[75] Inventors: Indra R. Baxi, Solon, Ohio; Alan Parr, Ontario, Canada

[73] Assignee: Nitrojection Corporation, Middlefield, Ohio

[21] Appl. No.: 493,499

[22] Filed: Mar. 14, 1990

[51] Int. Cl.$^5$ .............................................. B29C 45/23
[52] U.S. Cl. ............................. 425/130; 264/328.13; 264/572; 425/562; 425/563; 425/564
[58] Field of Search ................ 425/130, 524, 540, 562, 425/563, 564; 264/572, 328.13

[56] References Cited
U.S. PATENT DOCUMENTS

| | | | |
|---|---|---|---|
| 2,940,123 | 7/1958 | Beck et al. | 425/564 |
| 3,895,897 | 7/1975 | Hudson | 425/540 |
| 4,033,710 | 7/1977 | Hanning | 425/543 |
| 4,082,226 | 4/1978 | Appleman et al. | 425/564 |
| 4,101,617 | 7/1978 | Friederich | 425/533 |
| 4,106,887 | 8/1978 | Yasuike et al. | 425/549 |
| 4,474,717 | 10/1984 | Hendry | 425/552 |
| 4,601,870 | 7/1986 | Sasaki | 264/572 |
| 4,671,762 | 6/1987 | Weiler et al. | 425/524 |
| 4,681,528 | 7/1987 | Marayama et al. | 425/564 |
| 4,723,898 | 2/1988 | Tsutsumi | 425/549 |
| 4,781,554 | 11/1988 | Hendry | 425/564 |

FOREIGN PATENT DOCUMENTS 109468  9/1964  Netherlands ......................... 425/562

OTHER PUBLICATIONS

Article entitled, The Best of Two Worlds in Plastics Processing Machine Design, Dec. 9, 1982.

*Primary Examiner*—Timothy Heitbrink
*Attorney, Agent, or Firm*—Fay, Sharpe, Beall, Fagan, Minnich & McKee

[57] ABSTRACT

A nozzle for injecting viscous fluid such as a thermoplastic into a mold cavity of a mold body includes a tip section and a nozzle body secured thereto. The tip section serves as a sprue of the mold body. The mold body includes a core portion, a cover portion and a clamp plate for securing the core portion to the cover portion. The nozzle body having an inlet end, a discharge end, which communicates with the tip section, and a flow passage for viscous fluid extending from the inlet to the discharge end. A valve element is mounted for reciprocation in the nozzle body flow passage to control the flow of viscous fluid through the nozzle body discharge end. At least the tip section of the nozzle body is located in the mold body cover and the nozzle body is substantially positioned between the mold body cover and the clamp plate. The valve element can be a shut-off needle which is disposed for reciprocating movement in the nozzle body flow passage. A shut-off pin can be disposed for reciprocating movement in the non-viscous fluid flow passage of the shut-off needle to control a flow of fluid through the non-viscous fluid flow passage.

24 Claims, 7 Drawing Sheets

MINIATURIZED FOR GAS-ASSISTED INJECTION MOLDING

BACKGROUND OF THE INVENTION

This invention generally pertains to an injection molding apparatus. More specifically, the present invention relates to ah injection molding nozzle for such an injection molding apparatus.

The invention is particularly applicable to a nozzle for the injection of a viscous fluid, such as a molten plastic, and a non-viscous fluid, such as a gas, into an injection mold during a process such as gas augmented injection molding of plastic materials. However, it will be appreciated by those skilled in the art that the invention has broader applications and may also be adapted for use in many other injection molding environments where both a relatively viscous fluid, such as a plastic or wax, and a relatively non-viscous fluid, such as a gas or liquid, are injected into a mold cavity.

Injection molding processes have been widely known, not only for the production of molded articles made of various thermoplastic resins, but also for the production of lost wax masters used in the investment casting process. The solid injection molding process generally uses a thermoplastic material.

Solid injection molding employs the steps of injecting a plasticized (melted) thermoplastic material under high pressure into a finite mold space and then allowing the material to cool sufficiently so that it rehardens to the extent that it can retain its shape after removal from the mold. Thermoplastic materials, generally shrink during rehardening and, unfortunately, this shrinkage is exaggerated in heavier wall sections, bosses, ribs, gussets, etc. This usually results in sink marks and warpage in the molded products.

Packing the mold with more material by pressing the plastic material at a higher pressure into the mold is a common technique used to minimize such excessive shrinkage. However, packing builds internal stresses into the part and often cannot remove sink marks that are located away from the injection molding sprue or gate. Additionally, packing requires high clamp pressures between the parts of the mold body in order to prevent flashing of the plastic material.

Certain proposals have recently been made to fill the mold cavity with a plasticized thermoplastic material to a volume less than one hundred percent (100%) of the mold space and to utilize an inert gas injected under pressure into the partially plasticized material as it is cooling and rehardening to fill the rest of the volume in the mold cavity. The gas enters the part and moves along the paths of least resistance therein. Such paths are normally in areas where the thermoplastic body is thicker and has slower cooling sections, such as ribs, flow channels, chamfers, etc. In this way, with a suitably designed part, a continuous network of hollowed out sections can be provided. The material displaced by the gas from the middle of the sections moves out to fill the remainder of the mold space. This network of gas channels provides a uniform pressure distribution system throughout the mold space during part rehardening and cool down, thus minimizing internal stresses. The outer surfaces of thicker sections do not sink because gas has cored them out from the inside and gas pressure holds the plastic material up against the mold surfaces during rehardening. Sink in these sections takes place internally rather than on the exterior surfaces of the part. Since the pressure used for final filling of the part is confined to an area defined by the gas channels, the resultant force against the sections of the mold is relatively modest so that lower clamping forces on the mold are adequate.

Several types of such nozzles are known to the art. However, one disadvantage with such nozzles is the fact that they need to be externally heated in order to keep the plastic flowing through them completely molten as it flows into the mold cavity in the mold body. However, heating the nozzle is disadvantageous with respect to the piston and cylinder assembly utilized to control the reciprocation of a needle in the nozzle since it can interfere with the ability of the needle to successfully control the flow of molten plastic through the nozzle. Also, such nozzles are relatively large in size, thereby adding to the length of the injection molding apparatus.

Most of the nozzles which are adapted to inject both a viscous fluid such as a thermoplastic material and a non-viscous fluid such as a gas into a mold cavity do not allow the discharge of the gas back through the nozzle when the discharge of gas is required. Instead, in these nozzle systems, the nozzle is spaced away from the mold body in order to vent the gas pressure within the mold cavity. Even those nozzles which are adapted to vent the gas back through the nozzle are unsatisfactory because the molten plastic remaining in the nozzle or in the mold space is frequently vented back along with the gas. This can be deleterious to the gas lines in the nozzle and to the gas piping and valves downstream from the nozzle. Also, if such plastic solidifies in the gas lines in the nozzle, the nozzle becomes unusable until it is cleaned out, which is time consuming, difficult, and expensive.

Accordingly, it has been considered desirable to develop a new and improved injection molding nozzle which would overcome the foregoing difficulties and others while providing better and more advantageous overall results.

BRIEF SUMMARY OF THE INVENTION

In accordance with the present invention, a new and improved shut-off nozzle is provided for injecting a viscous fluid such as a thermoplastic.

More particularly in accordance with the invention, the nozzle comprises a nozzle body having an inlet end, a discharge end and a flow passage for the viscous fluid extending from the inlet end to the discharge end. The nozzle is held at an elevated temperature. A valve element is mounted for reciprocation in the nozzle body flow passage to control a flow of the viscous fluid through the nozzle body discharge end. A cylinder mechanism is carried by the nozzle body and is operatively connected to the shut-off valve for reciprocating the shut-off valve. A layer of insulation material is disposed between the cylinder mechanism and the nozzle body for retarding a flow of heat from the nozzle body to the cylinder mechanism.

In accordance with another aspect of the present invention, a nozzle is provided for injecting a viscous fluid, such as a thermoplastic, into a mold cavity of a mold body. The mold body includes a core portion, a cover portion and a clamp plate for securing the core portion and the cover portion to each other.

More particularly in accordance with this aspect of the invention, the nozzle comprises a tip section which serves as a sprue of the mold body and a nozzle body to which said tip section is secured. Said nozzle body comprises an inlet end and a discharge end which communicates with said tip section, and a flow passage for viscous fluid extending from said inlet end to said discharge end. A valve element is mounted for reciprocation in said nozzle body flow passage to control a flow of viscous fluid through said nozzle body discharge end. At least said tip section is located in said mold body cover and wherein said nozzle body is substantially positioned between said mold body cover and said clamp plate.

According to another aspect of the invention, an apparatus for molding a plastic part is provided.

More particularly in accordance with this aspect of the invention, the apparatus comprises an injection molding machine adapted for plasticizing and discharging thermoplastic materials, said injection molding machine having an outlet end. A mold body including a core portion and a cover portion wherein a mold cavity is defined between said core portion and said cover portion, said mold cavity being adapted for receiving a flowable thermoplastic material from said injecting molding machine, and a mounting aperture located in said cover portion and communicating with said mold cavity. A nozzle body is secured in said mold body mounting aperture and has an inlet and in communication with said injection molding machine, a discharge end in communication with said mold cavity and a fluid passage extending from said inlet end to said discharge end. A first valve controls a flow of the thermoplastic material through said nozzle body fluid passage.

In accordance with a further aspect of the invention, a nozzle is provided for injecting a viscous fluid and a non-viscous fluid.

More particularly in accordance with this aspect of the invention, the nozzle comprises a nozzle body having an inlet end, a discharge end, and a flow passage extending from said inlet end to said discharge end. A shut-off needle is disposed for reciprocating movement in said nozzle body flow passage to control a flow of viscous fluid through said nozzle body discharge end. A non-viscous passage extends in said shut-off needle and terminates at a front end thereof. A shut-off pin is disposed for reciprocating movement in said non-viscous fluid flow passage of said shut-off needle to control a flow of fluid through said non-viscous fluid flow passage.

One advantage of the present invention is the provision of a new and improved nozzle which can be used for injection molding.

Another advantage of the present invention is the provision of a nozzle having a needle which reciprocates to control the flow of thermoplastic fluid therethrough and in which the control mechanism for actuating the needle is isolated from the heat to which th nozzle itself is exposed.

Still another advantage of the present invention is the provision of a nozzle which is at least partially housed in a mold body cover portion so as to reduce the amount of heat necessary to heat the nozzle as well as to reduce the length of the entire injection molding mechanism.

Yet another advantage of the present invention is the provision of a nozzle which is capable of controlling the flow of a viscous fluid, such as a molten plastic into a mold cavity and of a non-viscous fluid, such as a gas, into the mold cavity and allows the venting of the non-viscous fluid out of the mold cavity back through the nozzle.

A further advantage of the present invention is the provision of a nozzle having a shut-off needle, disposed for reciprocating movement in the nozzle body flow passage to control the flow of viscous fluid, and a shut-off pin. The shut-off pin reciprocates in a non-viscous fluid flow passage extending through the shut-off needle to control the flow of non-viscous fluid through the needle.

Still other benefits and advantages of the invention will become apparent to those skilled in the art upon a reading and understanding of the following detailed specification.

BRIEF DESCRIPTION OF THE DRAWINGS

The invention may take physical form in certain parts and arrangements of parts, preferred and alternate embodiments of which will be described in detail in this specification and illustrated in the accompanying drawings which form a part hereof and wherein:

FIG. 2A is an enlarged view of a portion of the nozzle of FIG. 2;

DETAILED DESCRIPTION OF THE PREFERRED AND ALTERNATE EMBODIMENTS

Figure 5:
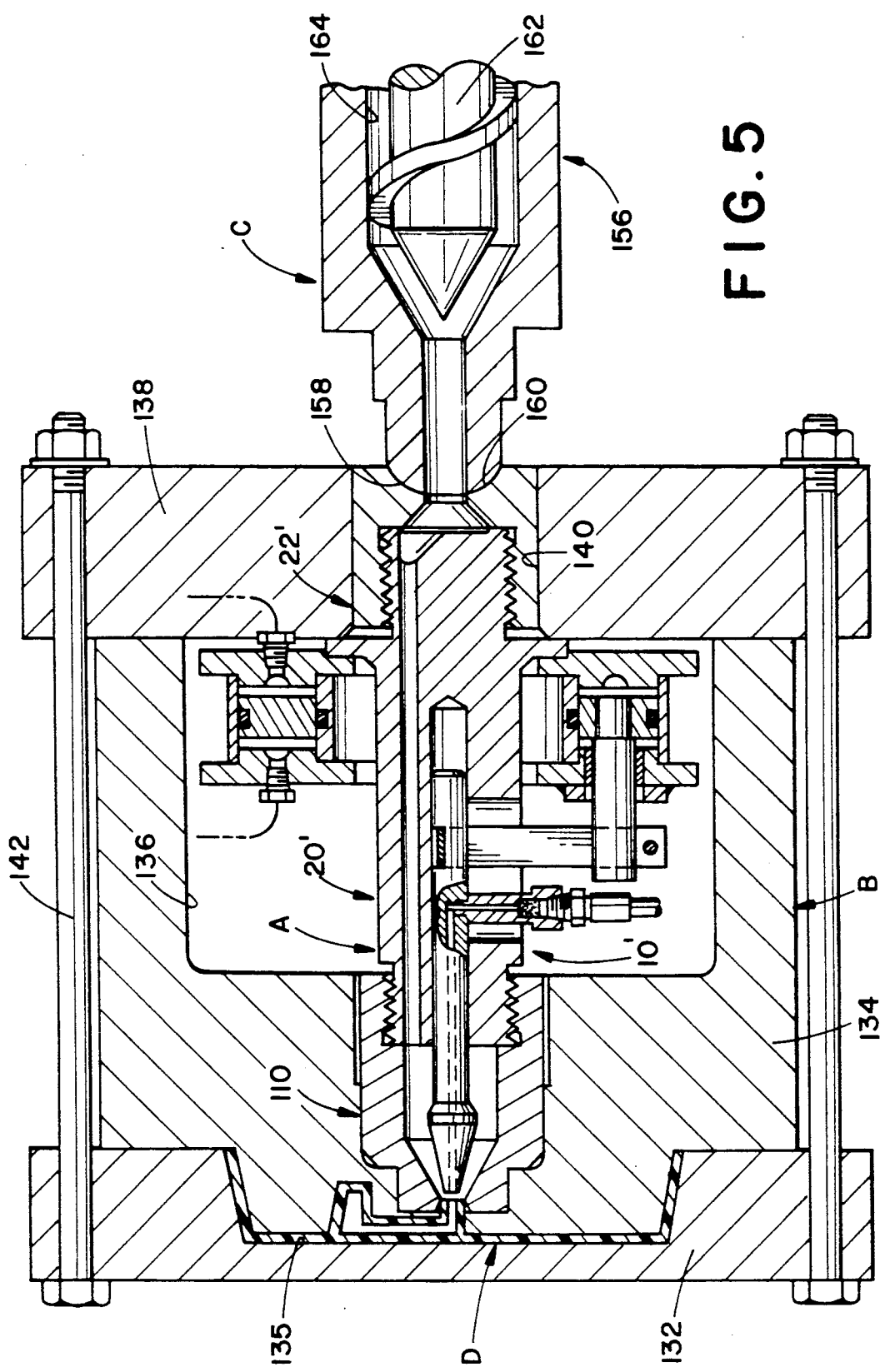
FIG. 5 is a reduced side elevational view in partial cross-section of the structure of FIG. 4 also illustrating an injection molding apparatus which cooperates therewith.

Referring now to the drawings, wherein the showings are for purposes of illustrating preferred and alternate embodiments of the invention only and not for purposes of limiting same, FIG. 5 shows the subject new nozzle A located between a mold body B and an injection molding machine C. While the nozzle is primarily designed for and will hereinafter be described in connection with an apparatus used for the injection molding of a molten thermoplastic with a gas, it should be appreciated that the nozzle can also be used in various other molding environments in which a relatively viscous fluid and a relatively non-viscous fluid are injected, such as for the production of lost wax masters and the like.

Figure 2:
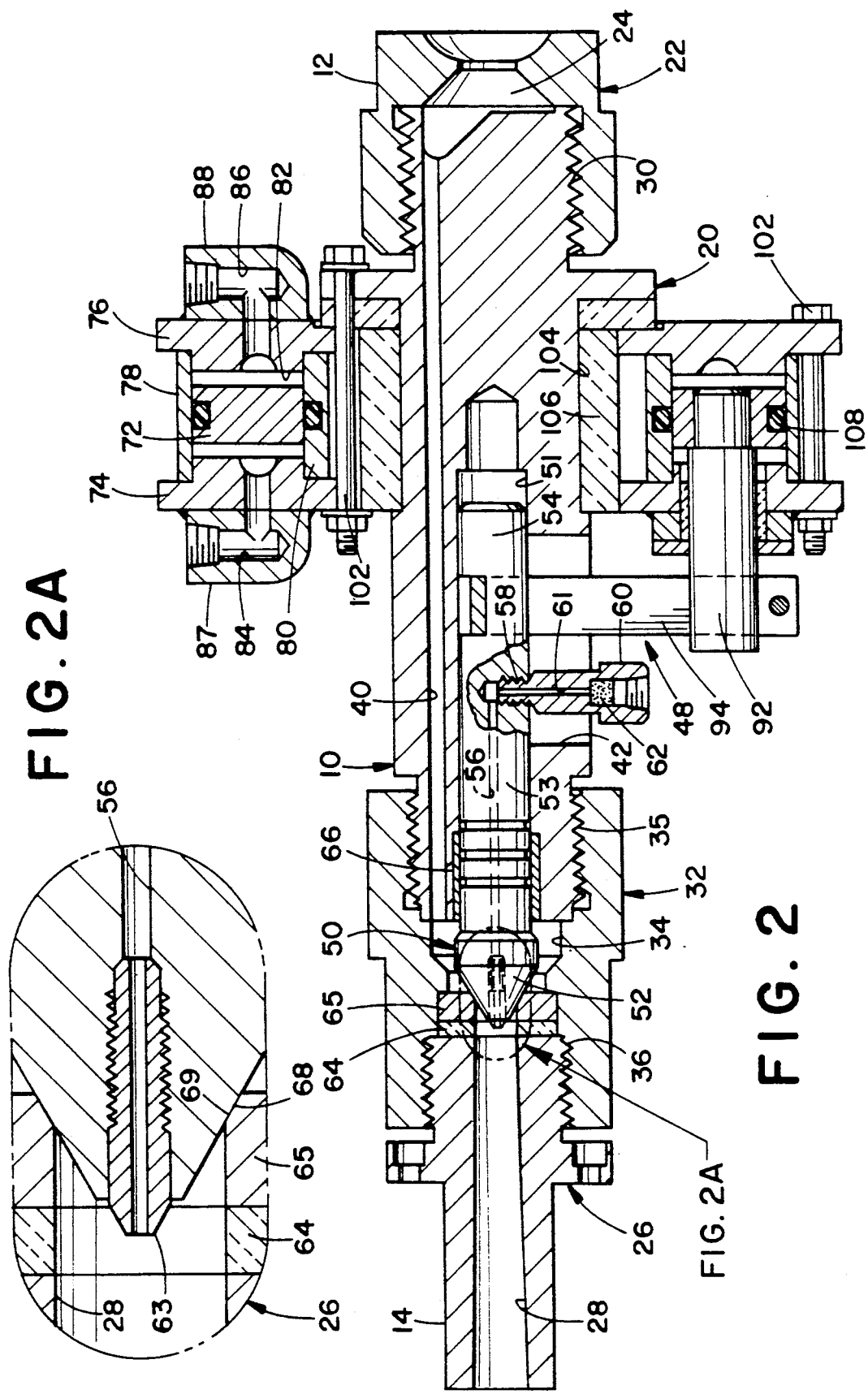
FIG. 2 is a side elevational view in cross-section along line 2—2 of the nozzle of FIG. 1.

With reference now for clarity's sake to the first alternate embodiment illustrated in FIG. 2, the nozzle comprises a nozzle body 10 having an inlet end 12 and a discharge end 14. The nozzle includes a housing which includes a central section 20, an adapter or rear section 22 having a longitudinal bore 24 extending therethrough and a tip or front section 26 having a longitudinally extending bore 28 therethrough. The adapter 22 is suitably secured to the central section 20 by interengaging threads as at 30.

Securing the tip 26 to the central section 20 is a suitable coupling member 32 which has a central longitudinally extending bore 34 therethrough with the bore having a pair of spaced threaded areas 35 and 36 which respectively cooperate with threaded exterior peripheries provided on the tip 26 and a front end of the central section 20.

Figure 1:
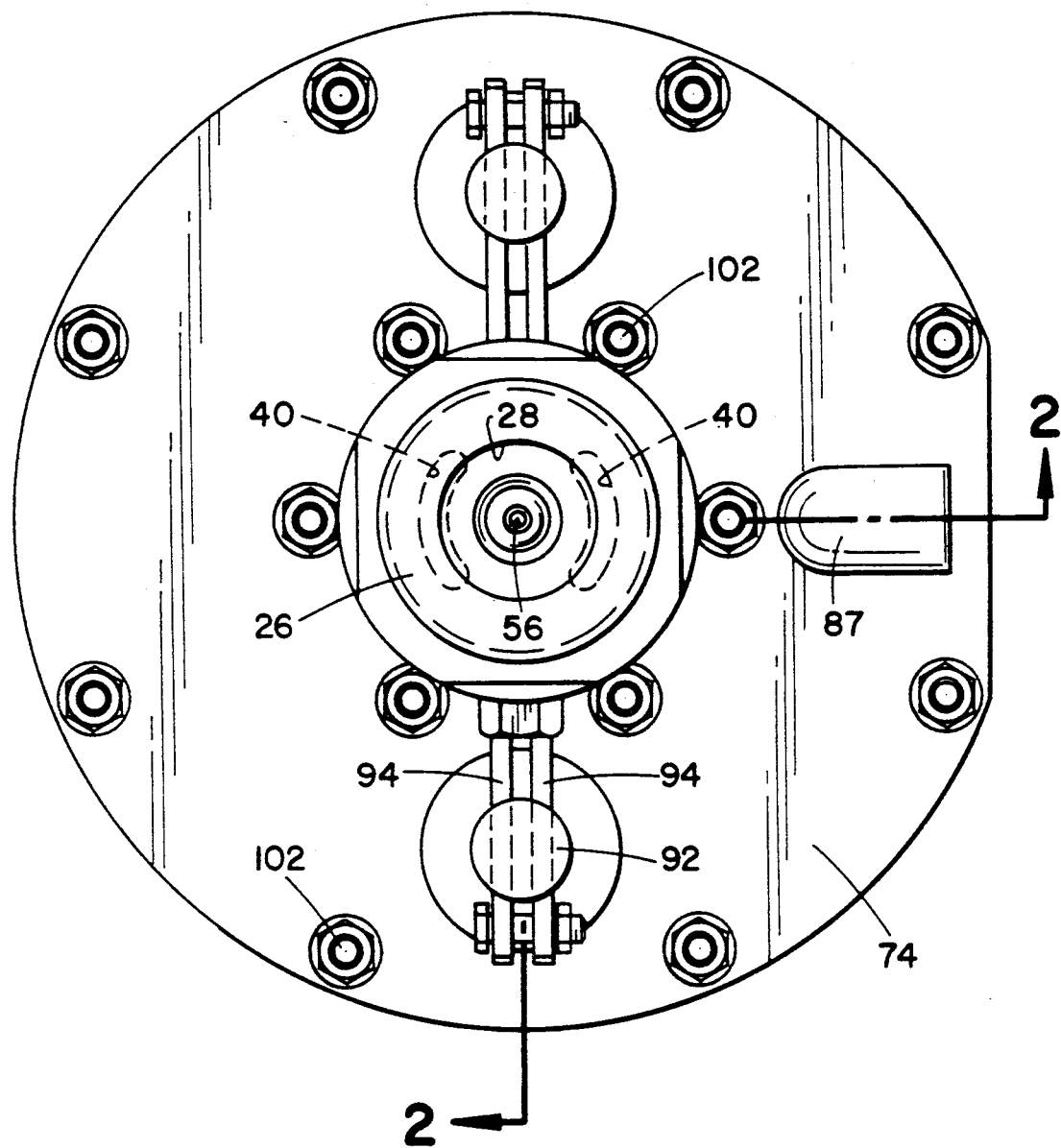
FIG. 1 is a front elevational view of an injection nozzle according to a first alternate embodiment of the present invention.

The central section 20 has a first aperture 40 extending longitudinally therethrough in an orientation which is coaxial with the bores 24 and 28 in th (R)adapter and tip respectively. There are preferably two such kidney-shaped apertures 40 as shown in FIG. 1. This allows the formation of the flow channel entirely through the nozzle A. A second aperture 42 extends through opposing side walls of the central section 20 in a direction normal to the first apertures 40 and not in communication therewith.

A valve body 48 is adapted to reciprocate in the nozzle body 10. For this purpose, a needle 50 of the valve body is reciprocally mounted in a third aperture or bore 51 extending longitudinally in the central section 20 in parallel with the first aperture 40. The needle has a tapered first end 52, a cylindrical central portion 53, and a flat second end 54. A longitudinal aperture 56 extends from the first end into the valve needle 50 until it meets a second aperture 58 which extends normal to the first aperture inwardly from the exterior periphery of the needle 50. The second aperture is suitably threaded so that it can receive an externally threaded fitting 60. Extending longitudinally through the fitting is a bore 61 that communicates with the longitudinal aperture 56 of the needle 50. In this way, a suitable relatively non-viscous fluid such as a gas can be transmitted through the fitting 60 into the needle 50 so that it can flow out the free end of the needle 50 and into the bore 28 in the tip 26. A filter 62 is preferably located in the bore in order to filter the gas flowing therethrough.

With reference now also to FIG. 2A, preferably secured to the needle first end 52 is a tube 63 which has a forward end thereof extending past the needle first end. The tube 63 is in fluid communication with the relatively non-viscous fluid flow aperture 56 extending through the needle 50. A layer of insulation 64 is preferably disposed between the nozzle body central section 20 and the tip 26.

The insulation 64 is advantageous in that it will restrict heat transfer from the nozzle to the sprue bushing 26. This will keep the plastic material in the sprue cool as the mold cools down by preventing the heat from the nozzle body central section 20 and the valve body 48 from being conducted along to the sprue. The plastic at the end of the sprue will thus solidify and will be in a solid state during venting of the relatively non-viscous fluid, such as the gas, back through the apertures 56 and 58. In this way molten plastic from the sprue does not enter the vent line which otherwise happens if the plastic in the sprue is still in a molten state.

The insulation 64 may be made of a mica material. Since such an insulation material is relatively weak in its impact strength, a spacer element 65 is preferably disposed between the insulation and the central section 20. The spacer is preferably made from a relatively hard material such as steel. It should be noted that through apertures are provided in the insulation 64 and the spacer 65, which apertures are coaxial with the tip bore 28 and the coupler bore 34.

Encircling a forward portion of the needle 50 is a wear bushing 66 which is preferably made from a relatively hard material such as carbide. The bushing is advantageous in that it serves to take the hammering of the shut-off pin, i.e., it's reciprocation, and reduces the amount of wear of the needle 50 in the central section 20.

The nozzle preferably further comprises a means for selectively urging the valve body 48 in a first direction so as to close the nozzle body discharge end 14 by abutting a side face 68 of the needle first or front end 52 against an angled portion 69 of the spacer element through which the tip bore extends. With reference again to FIG. 2, the means for selectively urging is secured to the nozzle body central section 20 and preferably comprises a toroidally shaped piston 72 which encircles the nozzle body central section 20. The piston 72 is held in a housing which is defined by first and second end caps 74 and 76 and cylindrical outer and inner jackets 78 and 80. These walls together define a housing with a chamber or cavity 82 in which the piston 72 is adapted to reciprocate. In communication with the two ends of the chamber 82 are respective bores 84 and 86 of fittings 87 and 88 that are secured to the end caps 74 and 76. The bores extend through the first and second end caps 74 and 76 to communicate with the chamber 82.

Figure 3:
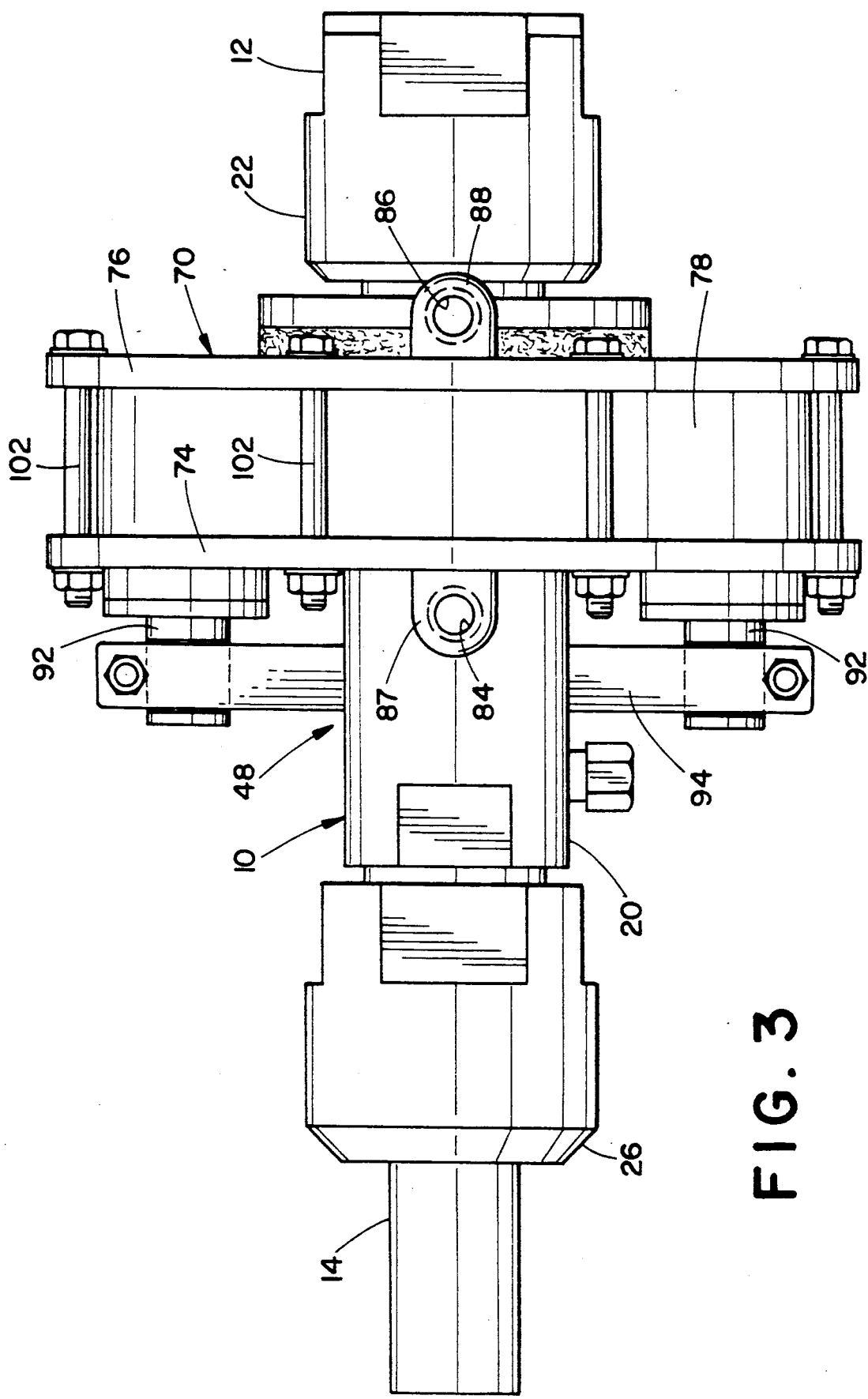
FIG. 3 is a top plan view of the nozzle of FIG. 1.

Secured to a front surface of the piston 72 are a pair of piston rods 92 (see FIG. 3) which extend through the first end cap 74 and are secured at their free ends to a pair of bars 94 (see FIG. 1) that are, in turn, secured to the needle 50 adjacent its second end 54. In this way, reciprocation of the piston 72 will also reciprocate the bar 94 and hence the needle 50 in the nozzle body central section 20 thereby selectively allowing and preventing communication between the longitudinally extending bore or aperture 40 in the central section 20 and the bore 28 in the tip 26.

Securing the means for urging 70 to the nozzle body 10, and securing the housing elements 74, 76, 78 and 80 to each other, are a plurality of fasteners 102 which may be in the form of nuts and bolts. Defined between the means for urging 70 and the nozzle body central section 20 is a toroidal gap 104 which is filled with a suitable insulating material 106, such as mica, in order to prevent the heat of the nozzle body 10 from being transmitted to the components in the means for urging 70. Some heat from the pin 50 is conducted to the means for urging 70 through the bars 94 and rods 92. However, these two elements 92, 94 are exposed to the environment and thus radiate away most of their heat.

It is advantageous to insulate the means for urging from the nozzle body because sealing elements, such as the seals 108 provided around the piston 72 to seal the two sides of the chamber 82 are degraded at high temperatures and thus a seizure of the piston is possible. Obviously, such a seizure would prevent the reciprocation of the needle 50. Also, air leaks around the piston 72 would be possible thereby reducing the force available for reciprocating the needle 50, which could lead to an inability to move the needle. Additionally, absent insulation of the means for reciprocating, a considerable proportion of the heat from the needle would be transmitted away to the means for reciprocating. In other words, the piston and its housing would act as a heat sink thereby withdrawing heat from the needle and making it difficult to assure that the needle and central section 20 are heated to the degree necessary to maintain the thermoplastic in a molten condition as it flows therethrough.

While any suitable conventional insulation can be used, the present application utilizes a mica material. It is noted that the only metal-to-metal contact between the housing elements and the central section 20 is by way of the bolts 102. Although the piston rods 92 are secured to the bars 94, these elements are exposed to the environment and hence are relatively cool. Accordingly, there is little heat transfer along this path.

Figure 4:
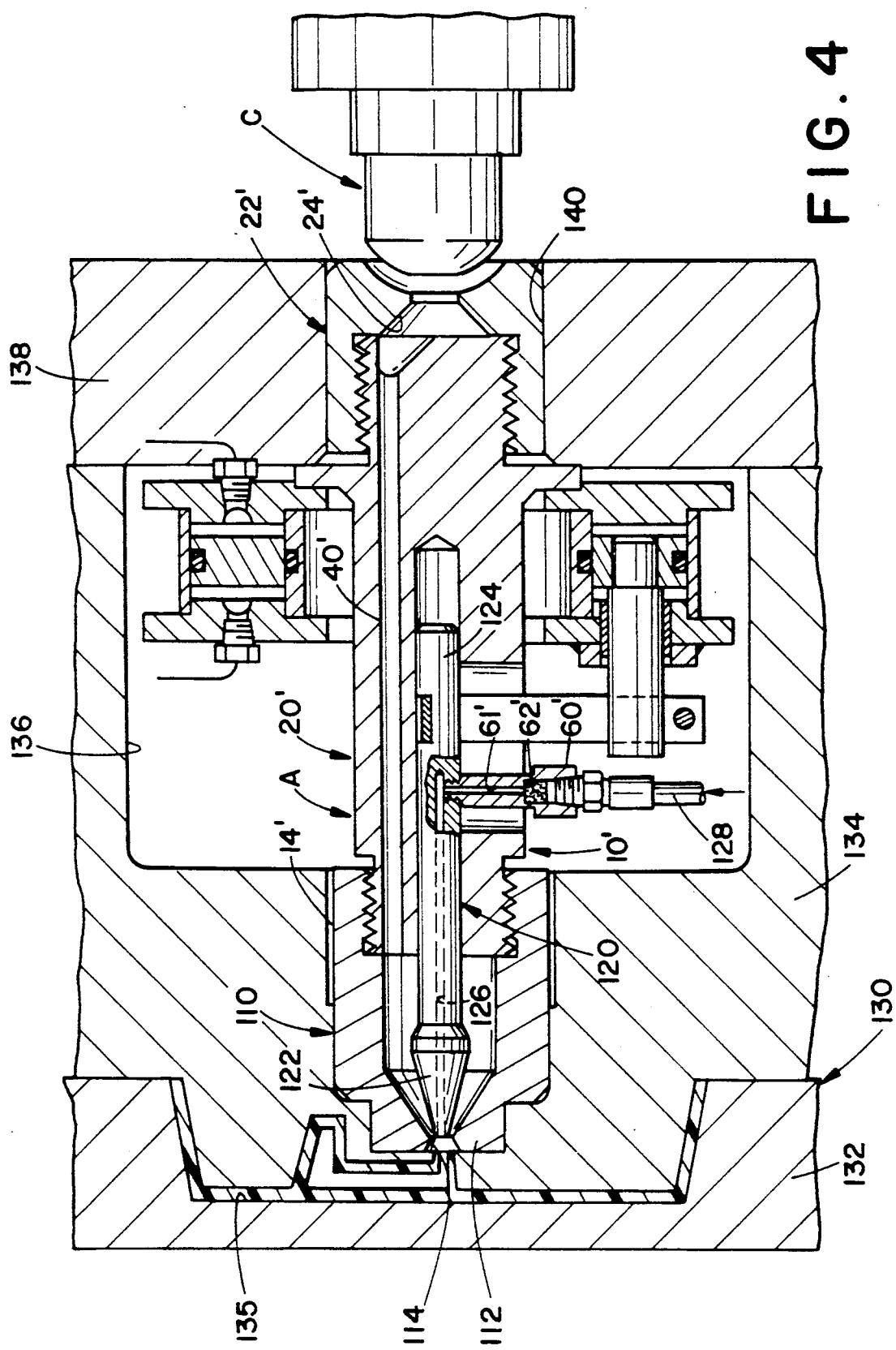
FIG. 4 is a side elevational view in partial cross-section of a nozzle according to a first preferred embodiment of the present invention secured between a mold body cover plate and a clamp plate.

With regard now to FIG. 4, a nozzle body according to the first preferred embodiment of the present invention, and having a slightly different form, is illustrated as it is meant to be housed in a mold body. For ease of illustration and appreciation of this embodiment, like elements will be identified by like numerals with primed suffixes (') and new components will be identified by new numerals.

In this embodiment, a nozzle body 10' includes a central section 20' as well as a rear section 22' and a somewhat different tip 110 provided at a front end or discharge end 14'. The tip 110 utilizes a reduced diameter front section 112 which is considerably shorter than that utilized by the tip 26 in the embodiment illustrated in FIG. 2. The front section terminates in a outlet bore 114.

Adapted to reciprocate in the nozzle body 10' to control a flow of thermoplastic through a first aperture 40' therein is a needle 120 having a forward end 122 which can seal against the tip 110 to prevent flow therethrough, and a second end 124. A longitudinal aperture 126 extends through at least a portion of the needle 120 so that it can communicate with a bore 61' extending through a fitting 60'. The fitting 60' communicates a hose 128, which supplies a pressurized fluid, with the needle aperture 126.

Positioned in the bore is an air filter 62'. The air filter preferably has a porosity such as 60 microns. It may also have two through bores (not visible) on the order of 0.010 inches in order to allow an unrestricted inflow of gas. The filter 62' is especially useful during the outflow of the gas during depressurization of the gas cavity to trap plastic particles which "dust off" the inner surface of the gas cavity formed in the plastic member molded in the mold cavity.

A mold body 130 which is adapted for use with the nozzle body 10' includes a mold body core 132 and a mold body cover 134. These two elements define between themselves a mold space or cavity 135. Communicating with the mold cavity 135 is an outlet bore 114 of the tip 110. It can be seen that formed in the mold body cover 134 is a suitable chamber 136 for accommodating substantially the entire nozzle A. Designed to enclose the nozzle A in the mold body cover chamber 136 is a suitable clamp plate 138. It should be noted, however, that the clamp plate has a through bore 140 through which extends the adapter 22'.

With reference now also to FIG. 5, securing the clamp plate 138 to the mold body are suitable fasteners 142. While in the embodiment illustrated in FIG. 5, the fasteners are shown as securing the mold body core 132 to the clamp plate 138 so as to hold the mold body cover 134 therebetween, it should be appreciated that other clamping configurations could also be utilized. For example, one common clamping configuration utilizes separate clamping plates, one positioned on a rear face of the mold body core and another located on a front face of the mold body cover, with both plates having a common dimension larger than the mold body core and cover, so as to have the fasteners extend only through the clamp plates.

Located at the front of an injection molding machine housing 156 is a radiused surface 158 which cooperates with an indented surface 160 of the rear section or adapter 22'. Located in the housing 156 is a screw 162 that is positioned in a bore 164. It should be noted that the bore 164 communicates with a bore 24' extending through the adapter 22', which in turn communicates with an aperture 40' extending through the nozzle body central section 20'. In this way, plasticized thermoplastic material can be advanced by the screw 162 through the various bores to the tip 110 and thence into the mold body cavity 135 to form a plastic body D.

It is advantageous to house the entire nozzle or at least a substantial portion of it in the mold cover since in this way, the nozzle remains hot and no external heating rings such as are conventionally necessary for the nozzle are needed. In addition, there is more control provided over the plastic flow since the surface area of the sprue is reduced and gas flows directly into the mold cavity. In other words, no molten plastic is located between the sprue and the needle which aids in easily decompressing gas from the mold cavity. With a longer sprue and more molten thermoplastic located between the needle and the mold cavity there is more of a likelihood that molten plastic will be sucked into the gas lines plugging them. Finally, the positioning of the nozzle in the mold cover enables an easier setup of the entire molding mechanism, as well as enabling the machinery to be somewhat more compact.

Figure 6:
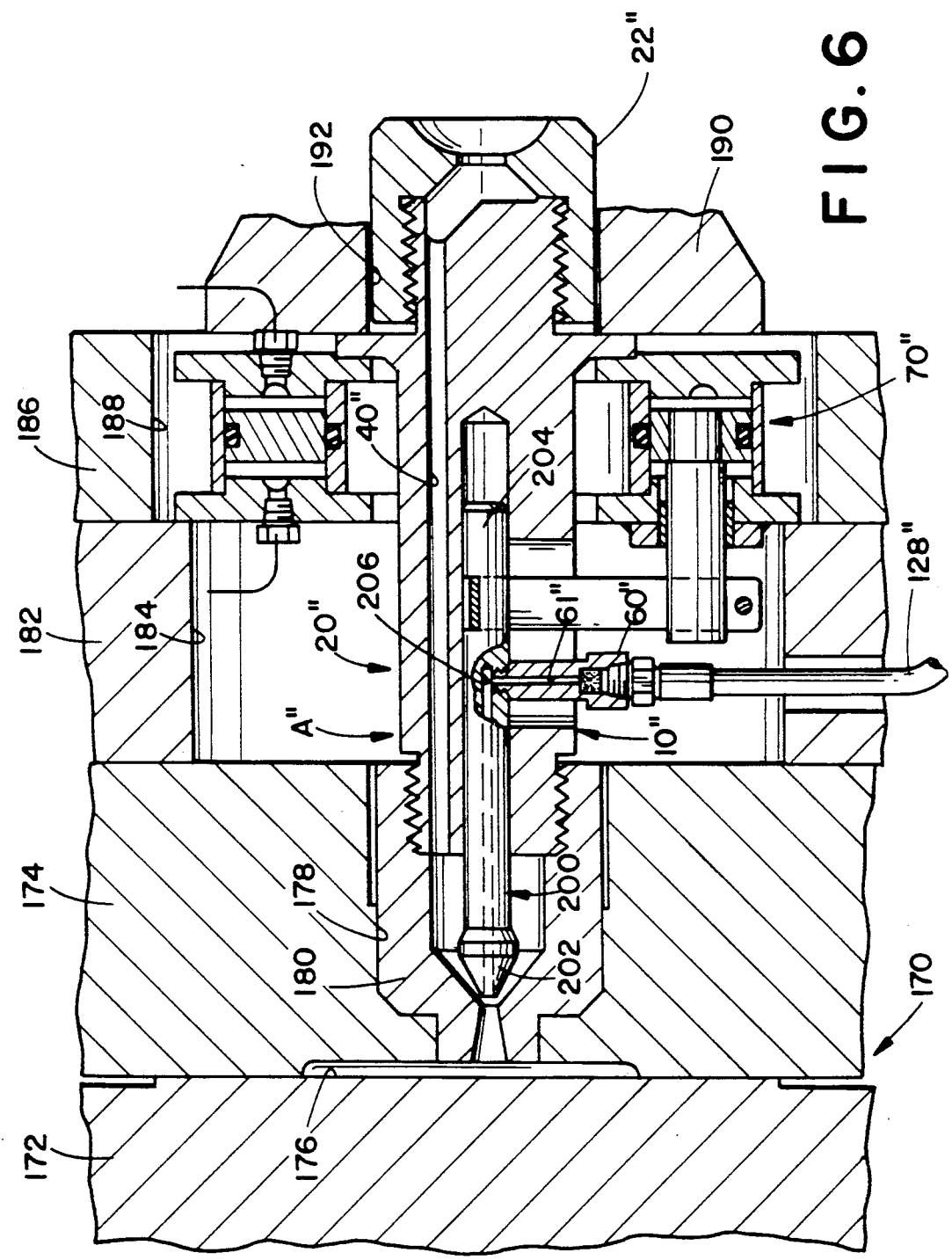
FIG. 6 is a side elevational view in cross-section through a second alternate embodiment of the nozzle mechanism according to the present invention; and, FIG. 7 is a greatly enlarged side elevational cross-sectional view through a nozzle needle and a pin according to a second preferred embodiment of the present invention.

With reference now to FIG. 6, a second alternate embodiment of the present invention is there illustrated. For ease of comprehension and appreciation of this alternative, like components will be identified by like numerals with a double primed (") suffix and new components will be identified by new numerals.

In this embodiment, a mold system 170 includes a mold body core 172 which adjoins a mold body cover 174 such that they define between them a mold chamber or cavity 176. Located in the mold body cover 174 is a chamber 178 which is so defined as to hold a tip 180 of a mold nozzle. Located adjacent the mold body cover 174 is a support plate 182 which has defined therein a through aperture 184 that is so sized as to be able to hold a portion of the nozzle. Located adjacent to the support plate 182 is a clamp plate 186 which serves to clamp the mold body core 172, cover 174 and support plate 182 to each other. Extending through the clamp plate 186 is a bore 188 of a suitable diameter so as to accommodate a means for urging 70" that is associated with the nozzle body 10" as in the earlier embodiments. Positioned on a rear side of the clamp plate 186 is a locating ring 190 which has a suitable aperture 192 extending therethrough in order to accommodate an adapter 22" that is threadedly secured to a mold body central section 20" as in the previous embodiments.

Adapted to reciprocate within a longitudinally extending bore 40" of the central section 20" is a needle 200 having a first end 202 that is considerably shorter and less tapered than was the first end 122 of the embodiment illustrated in FIGS. 4 and 5. The needle 200 also includes a second end 204 and a longitudinal aperture 206 which extends from the first end 202 such that it communicates with a bore 61" extending from a fitting 60″ threadedly secured to the needle 200. A suitable conduit 128″ is secured to the fitting 60″ in order to allow the flow of a fluid, such as a gas, in both directions, through the bore 206.

It can be seen that in this embodiment not all of the nozzle is located within the mold body cover 174. It is for this reason that the support plate 182 is necessary in this embodiment. Such an embodiment will be useful when the nozzle is to be employed in a mold having a very narrow mold cavity such as at 176, i.e., a fairly small size mold.

Figure 7:
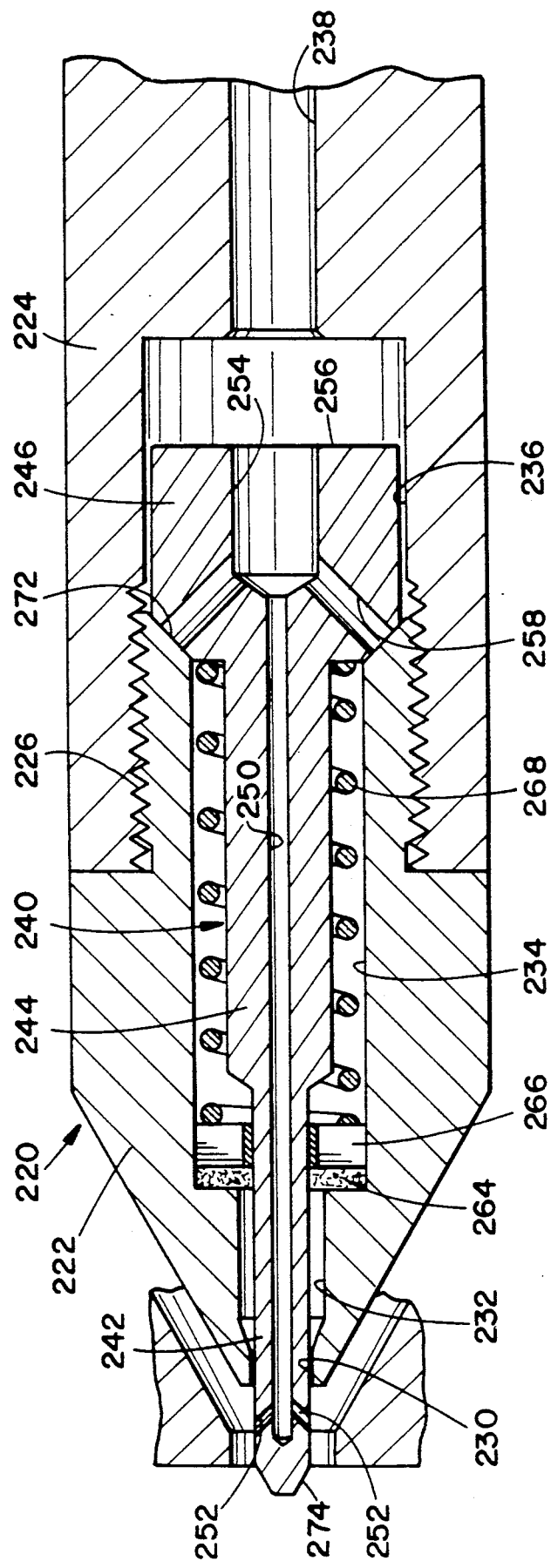

With reference now to FIG. 7, a needle construction is there illustrated which could be employed in place of any of the needles 50, 120 and 200 illustrated respectively in FIGS. 2, 4, and 6. The needle construction of FIG. 7 is preferred.

In the needle construction illustrated in this FIGURE, a needle 220 includes a first or forward member 222 and a second or rear member 224 with the two members being suitably selectively secured together as at a threaded area 226. Extending longitudinally through the forward member 222 is a bore which includes a first section 230 of a first diameter, a second section 232 of a somewhat larger second diameter and a third section 234 of a yet larger third diameter. The forward member bore communicates with a longitudinally extending rear member bore which includes a fourth section 236 of a diameter yet larger than the forward member third section 234 and a fifth section 238 of a second and smaller diameter.

It can be seen that a longitudinally extending flow path is thus defined by the series of bore section 230, 232, 234, 236 and 238 along the length of the needle 220. Adapted for reciprocation in the bore section 230, 232, 234 and 236 is a suitably shaped pin 240 which has a first or forward section 242 of a diameter such that it can slide in the bore section 230, a second, and larger diameter, central section 244 which can reciprocate in the third diameter bore section 234. The pin 240 also includes a third or rear section 246 which can reciprocate in the fourth diameter bore section 236.

Extending longitudinally through the pin 240 is a bore first section 250 which terminates at its forward end in a plurality of peripheral or cross ports 252 which extend at an angle to the bore section 250. Preferably four such ports 252 are provided equally spaced around the periphery of the pin forward section 242. In communication with the bore first section 250 is a larger diameter second bore section 254 extending from a rear end 256 of the pin 240. The bore second section 254 communicates with the bore first section 250 as well as with a pair of side ports 258 which extend at an angle in relation to the bore first section 250.

Located at a forward end of the bore section 234 is a filter 264 used for filtering a fluid flowing therethrough. The filter 264 is not press fit in place. Instead, there is a small gap between the filter and the front wall of the needle first section 222. The filter is necessary for decompression of the gas held in the mold cavity in order to prevent the flow back into the gas line of plastic particles which "dust off" when gas is decompressed from the gas cavity created in the molded product after the thermoplastic material has solidified. In other words, the filter is not used in order to filter the gas flowing into the mold cavity but rather to filter the gas flowing back out of the mold cavity in order to prevent thermoplastic particles from flowing back into the gas line and eventually clogging the line or a valve positioned in the line.

A support element or spider 266 is located adjacent the filter and is employed to center the pin 240 in the needle bore. Extending between the spider 266 and the pin third section 246 is a compression spring 268 which will resiliently bias the pin 240 in a rearward direction in the absence of fluid pressure. In the presence of fluid pressure such as is illustrated in FIG. 7, the pin 240 will advance forward, i.e., to the left in FIG. 7, in order to expose the peripheral ports 252 despite the urging of the compression spring 258.

The compression spring 268 requires a force of approximately 20–50 psi to compress it. In contrast, the minimum gas pressure which will flow through the series of bores in the needle and the pin is on the order of 2000 psi. Thus, when the gas pressure is initially introduced into the bore 238, it will slam the pin 250 forward with such force that the peripheral ports 252 will extend past the tip of the needle 220 and gas will subsequently flow out through the peripheral ports. In other words, fluid pressure will flow longitudinally from the right of FIG. 7 through the bore section 238, 236, 254 and 250 to the cross ports 252. The cross ports 252 are located in the needle first member second diameter bore section 232 when the pin 240 is retracted. Because the pressurized gas will slam the pin 250 forward in the needle 220, the angled ports 258 will not be utilized as no gas can flow out through them since these ports abut an angled surface 272 of the needle first member 222. Therefore, gas will not push the pin 250 back away from the surface 272 as it flows through the pin 250. When gas pressure ceases, the pin is, however, retracted simply due to the presence of the compression spring 268.

When decompression is desired and gas flow begins through the bore section 238, pressurized gas is allowed to flow back through the bore 230 around the angled or tapered side edges 274 of the pin 250 and into the bore section 232 through the filter 264 through the bore 234 and through the angled ports 258 into the bore 238 and then out of the needle.

The invention has been described with reference to preferred and alternate embodiments. Obviously, modifications and alterations will occur to others upon the reading and understanding of this specification. It is intended to include all such modifications and alterations insofar as they come within the scope of the appended claims or the equivalents thereof.

Having thus described the preferred embodiments, the invention is claimed as follows:

1. A compact mold construction including a nozzle for injecting a viscous fluid into a mold cavity of said compact mold construction, the compact mold construction comprising:

a mold body including a core portion and a cover portion, and a clamp plate for securing said core portion and cover portion to each other;

a sprue body located in said cover portion of the mold body;

a nozzle body to which said sprue body is operatively connected, said nozzle body comprising an inlet end, a discharge end, which communicates with said sprue body, and a flow passage for viscous fluid extending from said inlet end to said discharge end;

a valve element mounted for reciprocation in said nozzle body flow passage to control a flow of viscous fluid through said nozzle body discharge end; and, wherein at least a portion of said nozzle body and said valve element are located in a cavity formed in said mold body cover, and wherein a remainder of said nozzle body is substantially positioned between said mold body cover and said clamp plate.

2. The compact mold construction of claim 1 further comprising a cylinder mechanism carried by said nozzle body and operatively connected with said valve element for reciprocating said valve element.

3. The compact mold construction of claim 2 further comprising a thermal insulation layer interposed between said cylinder mechanism and said nozzle body to retard a flow of heat from said nozzle body to said cylinder mechanism.

4. The compact mold construction of claim 1 further comprising a layer of thermal insulation material which is disposed between said nozzle body discharge end and said sprue body for insulating said sprue body from said nozzle body.

5. The compact mold construction of claim 2 wherein said cylinder mechanism comprises:
radially extending first and second cap plates which are spaced from each other;
first and second axially spaced inner and outer housing jackets which are secured to said first and second cap plates to form a fluid chamber for receiving a pressurized fluid;
a piston member held for reciprocation in said fluid chamber; and,
inlet and outlet assemblies provided for said fluid chamber to allow an entry and exit of pressurized fluid from said fluid chamber.

6. The compact mold construction of claim 1 wherein said valve element comprises a needle having an end adapted to selectively engage a portion of said sprue body to prevent a flow of viscous fluid therepast, said needle also comprising a non-viscous fluid flow passage which extends axially in said needle.

7. The compact mold construction of claim 6 further comprising a shut-off pin which is mounted for reciprocation in said non-viscous fluid flow passage, wherein said shut-off pin can selectively prevent a flow of a non-viscous fluid through said non-viscous fluid flow passage.

8. The compact mold construction of claim 6 further comprising a tube having one end secured to said needle first end, wherein said tube is in fluid communication with said non-viscous fluid flow passage.

9. The compact mold construction of claim 6 further comprising a bushing made of a material harder than the material from which said nozzle body is made, said bushing surrounding a portion of said needle, said bushing serving to limit wear of said needle against said nozzle body during reciprocation of said needle.

10. An apparatus for molding a plastic part, comprising:
an injection molding machine adapted for plasticizing and discharging thermoplastic materials, said injection molding machine having an outlet end;
a mold body including a core portion and a cover portion wherein a mold cavity is defined between said core portion and said cover portion, said mold cavity being adapted for receiving the thermoplastic materials from said injection molding machine, and a mounting aperture located in said cover portion and communicating with said mold cavity;
a sprue body secured in said mold body mounting aperture;
a nozzle body secured in said mold body mounting aperture, said nozzle body having an inlet end in communication with said injection molding machine, a discharge end operatively connected and in communication with said sprue body and a fluid passage extending from said inlet end to said discharge end; and,
a first valve for controlling a flow of the thermoplastic material through said nozzle body fluid passage.

11. The apparatus of claim 10 further comprising an actuator mechanism carried by said nozzle body and adapted for selectively reciprocating said first valve.

12. The apparatus of claim 11 further comprising:
a first layer of a thermal insulation material interposed between said nozzle body and said actuator mechanism; and,
a second layer of a thermal insulation material interposed between said nozzle body and said sprue body.

13. The apparatus of claim 10 wherein said first valve comprises:
a needle having an end adapted to selectively sealingly engage a portion said nozzle body and,
a non-viscous fluid flow passage extending longitudinally through said needle and terminating at said needle end.

14. The apparatus of claim 13 further comprising a second valve for controlling a flow of a non-viscous fluid through said needle non-viscous fluid flow passage.

15. The apparatus of claim 13 further comprising a tube secured to said needle end, said end in communication with said non-viscous fluid flow passage.

16. A nozzle for injecting a viscous fluid and a non-viscous fluid, comprising:
a nozzle body having an inlet end, a discharge end and a flow passage extending from said inlet end to said discharge end;
a shut-off needle disposed for reciprocating movement in said nozzle body flow passage to control a flow of the viscous fluid through said nozzle body discharge end;
a non-viscous fluid flow passage extending in said shut-off needle and terminating at a front end thereof; and,
a shut-off pin disposed for reciprocating movement in said non-viscous fluid flow passage of said shut-off needle to control a flow of fluid through said non-viscous fluid flow passage, wherein said shut-off pin in one position has an end which extends out of said needle to allow an outflow of the non-viscous fluid.

17. The nozzle of claim 16 wherein said shut-off pin comprises an elongated body having an enlarged portion.

18. The nozzle of claim 16 further comprising a biasing means for biasing said shut-off pin in one direction, said biasing means being located in said non-viscous fluid flow passage.

19. The nozzle of claim 16 wherein said shut-off pin reciprocates in such a manner that in one end position a forward end of said shut-off pin is located forwardly of a front end of said shut-off needle.

20. The nozzle of claim 16 wherein said shut-off pin includes a longitudinally extending bore for allowing a flow of the non-viscous fluid therethrough.

21. The nozzle of claim 20 wherein said shut-off pin further comprises at least one port extending at an angle in relation to said longitudinally extending bore, said at least one port communicating with said bore and being located adjacent a front end of said longitudinally extending bore, said port extending out of said needle when said shut-off pin is in said one position.

22. The nozzle of claim 21 wherein said shut-off needle comprises:
a base section; and,
a tip section, said tip section being threadedly received on said base section, wherein a first portion of said non-viscous fluid flow passage of said needle extends longitudinally through said tip section and communicates with a second portion of said non-viscous fluid flow passage which extends in said base section and wherein said shut-off pin is held in said non-viscous fluid flow passage between said base section and said tip section.

23. The nozzle of claim 16 further comprising a guide element for guiding a reciprocating movement of said pin in said needle.

24. The nozzle of claim 16 further comprising a filter member for filtering non-viscous fluid flowing through said needle.

* * * * *